No. 732,040. PATENTED JUNE 30, 1903.
E. R. BOWMAN.
CIDER PRESS.
APPLICATION FILED SEPT. 27, 1902.
NO MODEL. 2 SHEETS—SHEET 1.
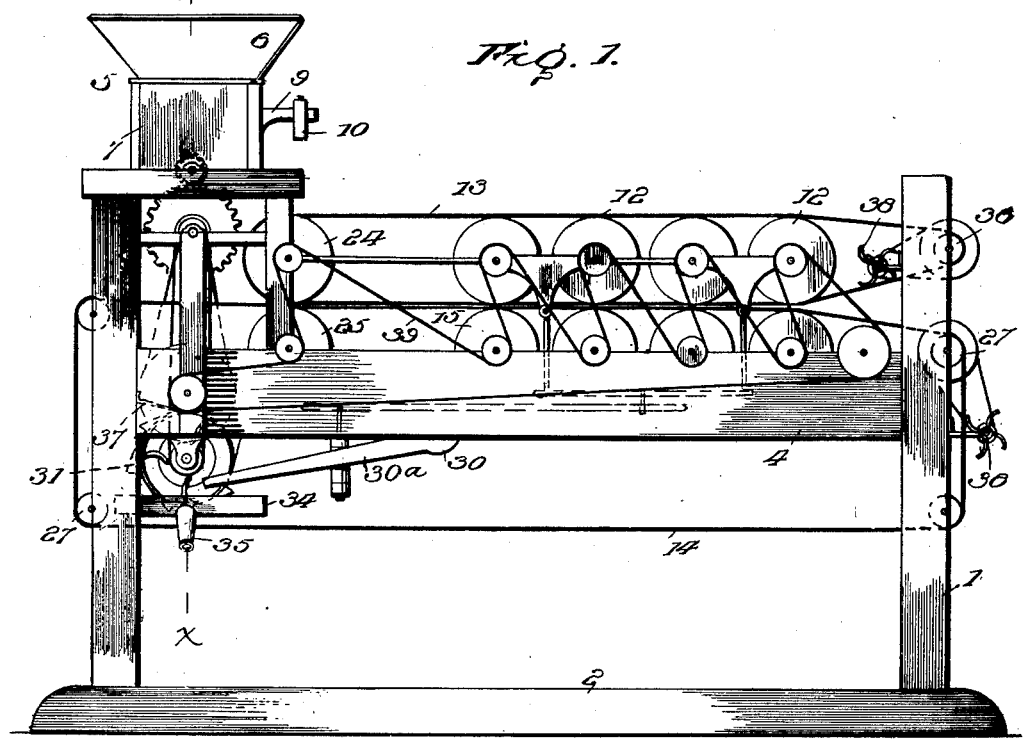
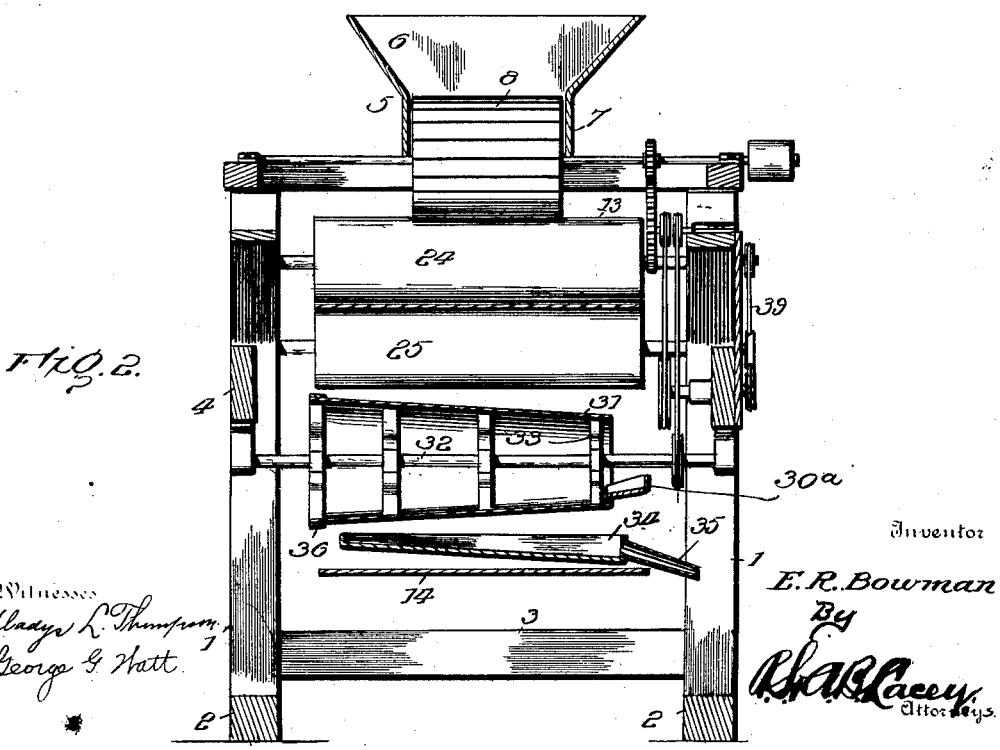

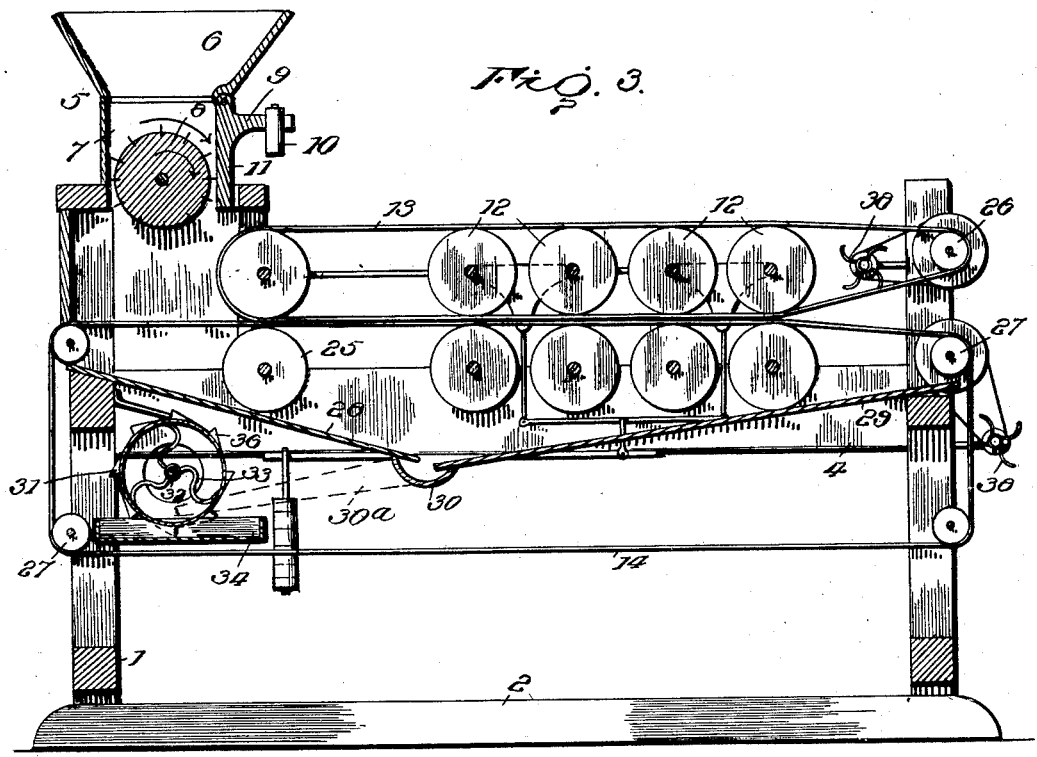
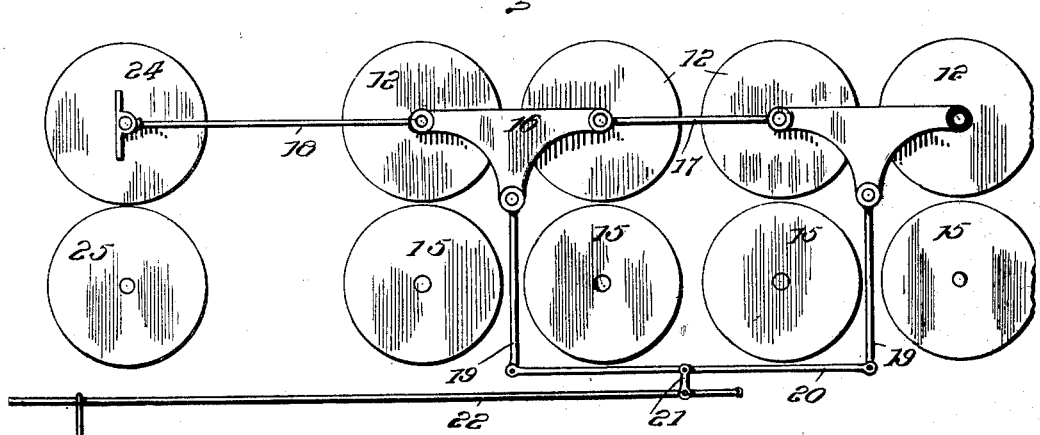

No. 732,040. Patented June 30, 1903.

UNITED STATES PATENT OFFICE.

ERASMUS R. BOWMAN, OF NEWMARKET, VIRGINIA, ASSIGNOR OF ONE-HALF TO RUDOLPH H. WAKEMAN, OF BROCKROAD, VIRGINIA.

CIDER-PRESS.

SPECIFICATION forming part of Letters Patent No. 732,040, dated June 30, 1903.

Application filed September 27, 1902. Serial No. 125,069. (No model.)

*To all whom it may concern:*

Be it known that I, ERASMUS R. BOWMAN, a citizen of the United States, residing at Newmarket, in the county of Shenandoah and State of Virginia, have invented certain new and useful Improvements in Cider-Presses, of which the following is a specification.

In accordance with this invention novel means are combined in a single organized machine for expressing the juices from fruit and other articles from which the essential part is capable of extraction by being subjected to a squeezing or compressing action, to grind the articles or substance, to express the juice or liquid part from the pomace or comminuted mass, and to separate the juice or liquid from the pomace after the expressing operation, the different mechanisms being combined to admit of a continuity of action essential to rapidity of work and large output from a machine of comparatively small size.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a side view of a press embodying the essential features of the invention. Fig. 2 is a transverse section thereof about on the line X X of Fig. 1 looking in the direction of the arrows. Fig. 3 is a central longitudinal section. Fig. 4 is a detail view of the compress-rolls, showing more clearly the mountings of the set of movable rolls.

Corresponding and like parts are referred to in the following description and indicated in all the views of the drawings by the same reference characters.

The apparatus for expressing juices and liquids from fruits, articles, and substance may be of any size, depending upon the capacity and special use of the machine, and the compress-rolls may be in any number. The working parts may be mounted in any determinate way, according to the finish and style of the machine, and for the sake of illustration the framework shown comprises corner-posts 1, longitudinal sills 2, cross-pieces 3, and longitudinal beams 4, which support the compress mechanism in the manner substantially as herein stated.

A mill 5 is located at one end of the machine and is adapted to grind or reduce the fruit or other article or substance to a pomace or comminutive mass preliminary to expressing the juices or liquids therefrom. The mill comprises a hopper 6 and a chamber 7, within which is located the bur or grinder 8. The rear wall of the chamber 7 is pivoted and is provided with an offstanding arm 9, supplied with a weight 10 for holding the lower portion of the wall 11 against the contiguous portion of the grinder. By having the wall 11 pivoted it is adapted to move away from the grinder to admit of the passage of any hard or unyielding object, thereby preventing material injury to the bur or grinder. After the object has cleared the mill the weight 10 returns the wall 11 to a normal position.

The compress-rolls are provided in two series or sets, the rolls 12 of the upper set being mounted so as to yield and adapt the space between the belts 13 and 14 to the bulk of pomace passing between the two sets of rolls. The rolls 15 of the lower set are mounted in fixed bearings and support the upper portion of the belt 14. The compress-rolls 12 are mounted in a floating frame, which is composed of a number of articulated elements to admit of independent movement of the rolls, according to the material passing between corresponding upper and lower rolls. The floating frame is weighted so as to hold the rolls 12 down upon the companion rolls 15 to insure thorough action of the press in removing the juices or liquids from the substance undergoing the compressing action. The floating framework is composed of corresponding side pieces, each of which consists of plates 16 and a system of links and levers, the link 17 connecting the inner ends of adjacent plates 16, the link 18 connecting the plate 16 with the front portion of the frame, and the links 19 connecting the lower ends of the plates 16 with the ends of the equalizing-lever 20, which in turn is connected by a link 21 with the lever 22, carrying the weight 23. The frame as a whole is adapted to move upward, or the plates 16 are adapted to oscillate to admit of the vertical movement of the rolls 12, having individual movement to conform to the bulk of the substance passing between coöperating rolls 12 and 15. While the floating frame is composed of parts pivotally connected, yet the rolls 12 are maintained in fixed relation, so as to coöperate with corresponding rolls 15. Each roll 15 has a corresponding roll 12, the corresponding rolls 12 and 15 being disposed in vertical relation, whereby the compressing force is expended in a perpendicular direction, thereby securing the best results.

A guide-roll 24 is located adjacent to the mill and supports one end of the belt 15. A roll 25 is located below the roll 24 and supports the part of the belt 14 against the action of the roll 24, and these rolls 24 and 25 serve to spread the pomace and subject the same to a preliminary compressing action, whereby the greater part of the juice or liquid is expressed. A small roll 26 is located at the rear end of the machine to support the rear part of the belt 13. The belt 14 has its upper and lower portions spaced apart a sufficient distance to receive between them the separator, deflecting-boards, and lower set of rolls 15 and 25. A series of guide-rolls 27 are provided to give proper direction to the belt 14 and support the end portions thereof. The end portions of the belts 13 and 14 are rearwardly diverged, whereby provision is had for detachment and escape of the pomace contained between them.

The belts 13 and 14 may be constructed of any suitable material which is strong enough to withstand the strain, capable of retaining the pomace, and adapted to provide a ready escape for the juices and liquids removed from the pomace by the compressing action of the rolls. The belt 14 extends forward of the belt 13 and beneath the mill, so as to receive the pomace and carry the same between the compress-rolls. The juice and liquids are received upon oppositely-inclined boards 28 and 29, which direct them into a trough 30. A spout 30ª extends from one end of the trough and conveys the pomace and juices to the separator. The separator consists of a drum 31, of foraminous, reticulated, or meshed material, and is supported upon a shaft 32 by spring-arms 33 or in any way to admit of the drum being jarred, so as to insure thorough and effective operation of the separator. The separating-drum is arranged transversely of the machine and tapers throughout its length, so as to automatically feed the liquid therethrough. A pan 34 is arranged beneath the separating-drum to catch the juices or liquids and is provided with a spout 35 for delivering the same into a suitable vessel. The separating-drum is agitated or jarred by means of the mechanism now to be described, the same consisting of a series of inclined lugs or cogs 36, arranged around the drum, and a spring 37, secured at one end to the frame and adapted to have its opposite end ride upon the inclined faces of the lugs or cogs 36 and impart short sharp blows to the separator as the latter rotates, the spring-supports 33 yielding to admit of effective application of the blows to impart a jar or jolt to the said drum.

A rotary beater 38 is provided for the rear portion of each of the belts 13 and 14 to dislodge any pomace tending to adhere thereto, and these beaters comprise a series of wings which successively strike the adjacent parts of the belts with sufficient force to detach any particles adhering thereto. Rotary movement is imparted to the rotatable parts by suitable gearing, substantially as shown, and since it is preferred to positively drive each of the compress-rolls so as to insure certain feed of the material through the press the gearing shown has been devised and consists of a drive-belt 39, passing around pulleys at the ends of the journals or shafts of the several rolls, said drive-belt passing alternately from one roll 15 to the roll 12 throughout the series, as shown most clearly in Fig. 1, thereby driving the series of rolls so that their adjacent portions travel in the same direction. This manner of connecting the series of rolls also admits of the compress-rolls 12 having individual movement in the manner stated.

Having thus described the invention, what is claimed as new is—

1. In a press, coöperating sets of compress-rolls, a floating frame consisting of loosely-connected parts provided with bearings for the rolls of one set to admit of said rolls having independent movement, substantially as specified.

2. In a press, two sets of compress-rolls, a floating frame consisting of loosely-connected parts provided with bearings for the rolls of one set, a system of levers coöperating with the floating frame, and means for applying pressure to hold coöperating rolls together, substantially as set forth.

3. In a press, two sets of compress-rolls, a floating frame provided with bearings for the rolls of one set, the floating frame being composed of parts pivoted or jointed to admit of independent play of the rolls, substantially as set forth.

4. In a press, two sets of compress-rolls, a floating frame provided with bearings for the rolls of one set, said frame being composed of jointed parts, a system of levers, means for applying force to the floating frame through said levers, and a single drive-belt for positively operating the rolls of the two series and rotating the same to compel the adjacent portions to travel in the same direction, said drive-belt passing alternately from the rolls of one series to the other, substantially as described.

5. In a press, and in combination with the expressing mechanism, a separating-drum, means for yieldingly supporting the drum, and means for imparting a jar or jolt thereto, substantially as set forth.

6. In a press, and in combination with the expressing mechanism, a separating-drum, spring-arms supporting the drum, a series of inclined cogs arranged around said drum, and means for riding upon the inclined cogs for imparting a series of blows thereto to jar and vibrate said drum, substantially as specified.

In testimony whereof I affix my signature in presence of two witnesses.

ERASMUS R. BOWMAN. [L. S.]

Witnesses:
  A. B. LACEY,
  ALBERT HARPER.